United States Patent
Martinez Canedo et al.

(10) Patent No.: US 9,727,377 B2
(45) Date of Patent: Aug. 8, 2017

(54) REDUCING THE SCAN CYCLE TIME OF CONTROL APPLICATIONS THROUGH MULTI-CORE EXECUTION OF USER PROGRAMS

(75) Inventors: Arquimedes Martinez Canedo, Princeton, NJ (US); Hartmut Ludwig, West Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 623 days.

(21) Appl. No.: 14/232,352

(22) PCT Filed: Jul. 16, 2012

(86) PCT No.: PCT/US2012/046869
§ 371 (c)(1),
(2), (4) Date: Jan. 13, 2014

(87) PCT Pub. No.: WO2013/010159
PCT Pub. Date: Jan. 17, 2013

(65) Prior Publication Data
US 2014/0165077 A1     Jun. 12, 2014

Related U.S. Application Data

(60) Provisional application No. 61/507,656, filed on Jul. 14, 2011.

(51) Int. Cl.
*G06F 9/45* (2006.01)
*G06F 9/48* (2006.01)
*G06F 9/50* (2006.01)

(52) U.S. Cl.
CPC ............ *G06F 9/4881* (2013.01); *G06F 8/451* (2013.01); *G06F 8/456* (2013.01); *G06F 8/41* (2013.01);
(Continued)

(58) Field of Classification Search
CPC .......... G06F 8/41; G06F 8/4452; G06F 8/451; G06F 8/456; G06F 8/45; G06F 9/4881;
(Continued)

(56) References Cited

U.S. PATENT DOCUMENTS 4,466,061 A * 8/1984 DeSantis ............... G06F 9/4881
                                                          711/118
5,093,916 A * 3/1992 Karp ........................ G06F 9/52
                                                          717/114
(Continued)

OTHER PUBLICATIONS

"Microsoft Computer Dictionary Fifth Edition" , Microsoft , 2002 , p. 406.*
(Continued)

*Primary Examiner* — Geoffrey St Leger (57) ABSTRACT

A method for pipeline parallelizing a control program for multi-core execution includes using (12) data dependency analysis on a control program to identify tasks that can be performed in parallel, identifying (13) a largest task Tmax requiring the most execution time of the identified tasks, identifying (14) cut-points in the largest task Tmax where data dependency delays decouple the task, inserting (15) delayed data dependencies into cut-points of the largest task Tmax to create N pipeline sub-tasks, in which N is a number of cores available to a processor on which the control program will be executed, and scheduling (16) the tasks and pipeline sub-tasks to the available processor cores.

17 Claims, 9 Drawing Sheets

(52) U.S. Cl.
CPC ............... *G06F 8/45* (2013.01); *G06F 9/505* (2013.01); *G06F 9/5038* (2013.01); *G06F 2209/5017* (2013.01)

(58) Field of Classification Search
CPC ........ G06F 9/50; G06F 9/5027; G06F 9/5038; G06F 9/505; G06F 9/5066; G06F 2209/5017
See application file for complete search history.

(56) References Cited

U.S. PATENT DOCUMENTS

| | | | | |
|---|---|---|---|---|
| 5,452,461 | A * | 9/1995 | Umekita | G06F 8/45 717/146 |
| 5,944,814 | A * | 8/1999 | McCulloch | G06F 9/5066 712/15 |
| 6,199,093 | B1 * | 3/2001 | Yokoya | G06F 8/451 718/100 |
| 7,840,914 | B1 * | 11/2010 | Agarwal | G06F 8/451 716/102 |
| 2004/0088529 | A1 * | 5/2004 | Schreiber | G06F 17/5045 712/245 |
| 2005/0188364 | A1 * | 8/2005 | Cockx | G06F 8/456 717/159 |
| 2007/0220525 | A1 * | 9/2007 | State | G06F 9/4881 718/107 |
| 2008/0022278 | A1 * | 1/2008 | Gschwind | G06F 9/4856 718/100 |
| 2008/0163183 | A1 * | 7/2008 | Li | G06F 8/456 717/149 |
| 2008/0172674 | A1 * | 7/2008 | Yee | G06F 9/5038 718/106 |
| 2008/0244549 | A1 * | 10/2008 | Kejariwal | G06F 8/456 717/160 |
| 2008/0276262 | A1 * | 11/2008 | Munshi | G06F 8/41 719/328 |
| 2009/0031290 | A1 * | 1/2009 | Feng | G06F 8/456 717/126 |
| 2009/0164759 | A1 * | 6/2009 | Bell, Jr. | G06F 9/3842 712/216 |
| 2009/0307704 | A1 * | 12/2009 | Munshi | G06F 9/4843 718/104 |
| 2010/0223605 | A1 * | 9/2010 | Dai | G06F 8/456 717/151 |
| 2011/0004883 | A1 * | 1/2011 | El-Moursy | G06F 9/4881 718/103 |
| 2011/0161944 | A1 * | 6/2011 | Cho | G06F 8/433 717/149 |
| 2011/0209153 | A1 * | 8/2011 | Suzuki | G06F 9/5038 718/102 |
| 2012/0110047 | A1 * | 5/2012 | Hildrum | G06F 9/4881 708/104 |
| 2013/0006988 | A1 * | 1/2013 | Li | G06K 9/00973 707/737 |
| 2014/0026145 | A1 * | 1/2014 | Canedo | G06F 8/433 718/105 |
| 2015/0135186 | A1 * | 5/2015 | Lin | G06F 9/505 718/104 |

OTHER PUBLICATIONS

Douillet, A., et al., Software-Pipelining on Multi-Core Architectures, 16th International Conference on Parallel Architecture and Compilation Techniques, 2007, pp. 39-48, [retrieved on Apr. 6, 2017], Retrieved from the Internet: <URL:http://ieeexplore.ieee.org/>.*

Schiano, L. et al., Scan Test of IP Cores in an ATE Environment, Proceedings of Second IEEE International Workshop on Electronic Design, Test and Applications, 2004, 6 pages, [retrieved on Apr. 6, 2017], Retrieved from the Internet: <URL:http://ieeexplore.ieee.org/>.*

Min-Cut Program Decomposition for Thread-Level Speculation; Johnson, et al; Proceedings of the 2009 ACM SIGPLAN Conference on Programming, Language Design and Implementation, PLDI '09, vol. 39, pp. 59-70, XP55041001; 2004; US; Jan. 1, 2004.

Partitioned Fixed-Priority Preemptive Scheduling for Multi-Core Processors; Lakshmanan, et al.; Real-Time System, 2009; ECRTS '09. 21st Euromicro Conference ON, IEEE, Piscataway, NJ USA; pp. 239-248; XP031487735; 2009; US; Jul. 1, 2009.

Compiler Transformations for High-Performance Computing; Bacon, et al; ACM Computing Surveys, ACM, New York, NY, US; vol. 26, No. 4; pp. 345-420; XP002246513; 1994; US; Dec. 1, 1994.

Joint Throughput and Energy Optimization for Pipelined Execution of Embedded Streaming Applications; Po-Kuan Huang, et al; Proceedings of the 2009 ACM SIGPLAN Conference on Programming Language Design and Implementation, PLDI '09, vol. 42, pp. 137-139, XP55041003; 2007; US; Jan. 1, 2007.

Parallel-Stage Decoupled Software Pipelining; Raman, et al; Proceedings of the 6th Annual IEEE/ACM Int'l Symposium on Code Generation and Optimization, CGO '08, pp. 114-123, XP55041005; 2008; US; Jan. 1, 2008.

International Search Report dated Oct. 24, 2012.

* cited by examiner

REDUCING THE SCAN CYCLE TIME OF CONTROL APPLICATIONS THROUGH MULTI-CORE EXECUTION OF USER PROGRAMS

CROSS REFERENCE TO RELATED UNITED STATES APPLICATIONS

This application claims priority from "Method for Reducing the Cycle Time of Control Applications through Multi-Core Execution of User Program", U.S. Provisional Application No. 61/507,656 of Canedo, et al., filed Jul. 14, 2011, the contents of which are herein incorporated by reference in their entirety.

TECHNICAL FIELD

This disclosure is directed to methods for reducing the scan cycle time of control applications through multi-core execution.

DISCUSSION OF THE RELATED ART

Figure 1:
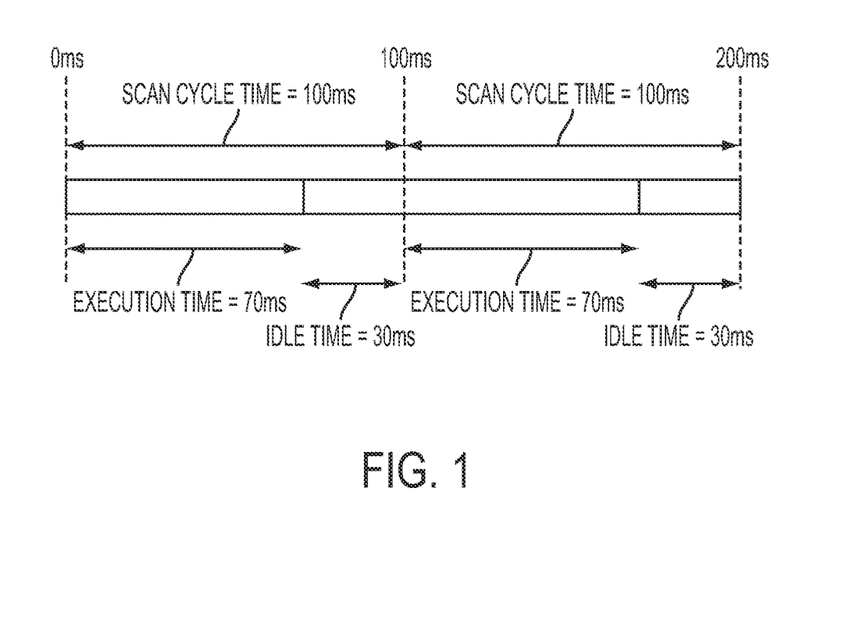
FIG. 1 illustrates a time-based (cyclic) control program with a scan cycle time of 100 ms, an execution time of 70 ms, and an idle time of 30 ms, according to an embodiment of the invention.

Control applications, such as programmable logic controllers (PLC), motion controllers, cyber-physical systems, etc., are typically executed periodically (cyclically). The scan cycle time refers to the period of time in which the system is expected to provide new results. The scan cycle time in control applications is configurable by the user and should not exceed the time it takes to execute the control program. The period of time between the end of program execution and the beginning of the next program cycle is called the idle time. FIG. 1 illustrates cycles of 100 ms each where the execution time of the program is 70 ms and the idle time is 30 ms.

Figure 2:
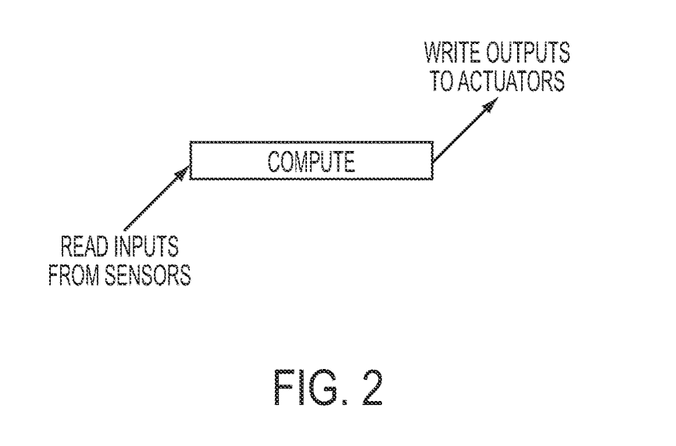
FIG. 2 is a schematic diagram of a control application, which read inputs from sensors, process the data, and write the outputs to actuators or memory, according to an embodiment of the invention.

Control programs read inputs from the sensors at the beginning of the cycle, process the data, and write the outputs to memory or actuators, as shown in FIG. 2.

Frequent sampling of the environment through the sensors is very important for a control algorithm because it improves measurement accuracy, resulting in more effective the control of the system.

The scan cycle time is dependent on the execution time. The goal of reducing the execution time of a program is to be able to execute the next cycle as soon as possible. For example, if a PLC program with a scan cycle time of 100 ms and an execution time of 70 ms is parallelized and the execution time is reduced by half (35 ms), then the scan cycle time of the program can be reduced to 50 ms. Smaller scan cycle times in a PLC program represent faster response times that are important for high-performance applications such as motion control. Reducing the execution time of a program can be achieved through optimization so that the number of total operations is reduced, or it can be achieved through executing operations faster. The optimization part is typically the job of optimizing compilers that eliminate redundant instructions and find better instruction sequences to reduce the total number of operations. The second option, executing instructions faster, is typically achieved through using faster microprocessors capable of executing more instructions per second.

However, microprocessor fabrication technology is reaching the physical limits of materials, and faster microprocessors are no longer a possibility. Instead, current and future microprocessors provide more performance through the introduction of multi-core processors which have additional processing elements in the same chip. The drawback of multi-core processors is that many applications do not take automatically advantage of the increased computational resources. Multi-core processors exploit a coarser parallelism at the task level that needs to be exposed by the programmer, the compilers, or the operating system.

Custom architectures, such as field-programmable gate arrays (FPGA) or application specific integrated circuits (ASIC) can be used, however, these solutions are very expensive and require experts. In addition, data dependency analysis can be used to find task-level parallelism suitable for multi-core processors, however, these methods can create load-unbalanced tasks that provide marginal performance improvements and in some cases performance degradation when compared to a single-core execution.

Finding and exploiting coarse grain parallelism in modern applications is one of the most challenging issues in computer science today. User applications, including control software, are typically written in languages that do not express task-level parallelism and therefore it is challenging to identify groups of instructions that are data independent. In control applications, although some degree of task-level parallelism is available, the load imbalance among tasks eliminates the benefits provided by parallel execution in multi-core processors.

The IEC 61131-3 standard defines 5 different programming languages for automation systems: 2 textual (Instruction List or IL, Structured Text or ST), 2 graphical (Ladder Diagram or LD, Function Block Diagram or FBD), and 1 with both textual and graphical representations (Sequence Function Chart or SFC). IEC 61131-3 programs are executed in processing units called resources. Several programs can run on one resource by time-sharing a uniprocessor.

A program is composed of one or more POUs (Program Organization Unit). POUs can be of type Function or FUN, Function Block or FB, and Program or PROG. POUs may be written in any of the five IEC 61131-3 languages. While a PROG is the top-level entry point of a program, POUs may call other POUs. An interesting aspect of programs is that they are instantiated into run-time synchronous or event-based prioritized tasks. A task must have a priority level and may be executed either periodically (cyclically) or driven by interrupts. The configuration contains the information about the allocation of programs into tasks with different synchronous properties, and tasks into resources.

Figure 3:
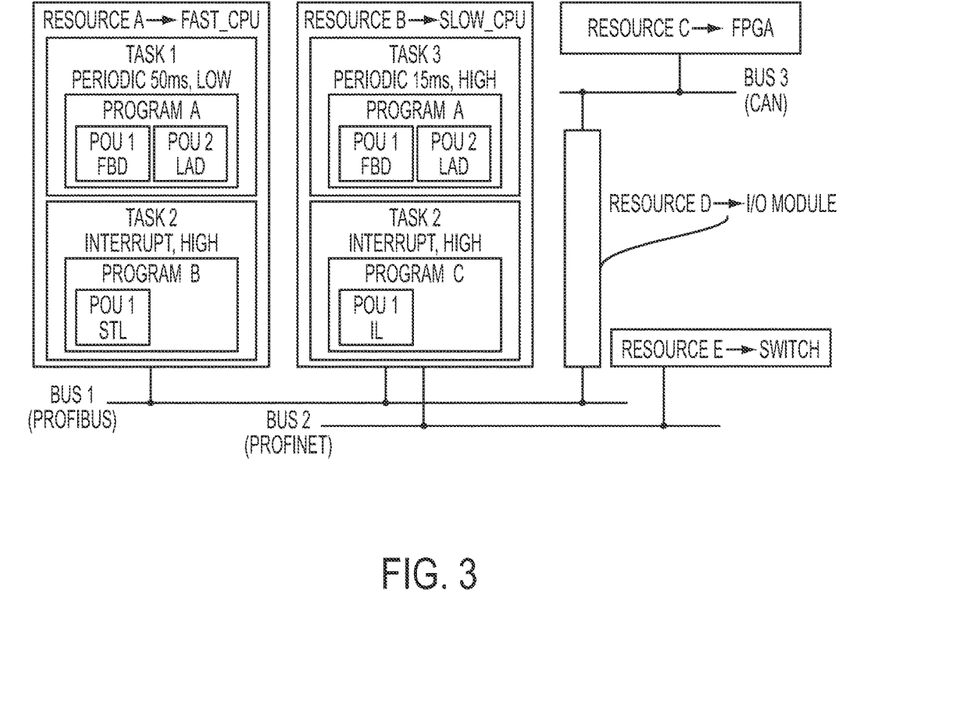
FIG. 3 illustrates the organization of an IEC 61131-3 user application and configuration, according to an embodiment of the invention.

FIG. 3 shows an exemplary user application comprising three programs: Program A, Program B, and Program C. The top level PROG in Program A calls two function blocks: "POU 1" that is written in FBD language and "POU 2" that is written in "LAD" language. Similarly, Program B calls a function block "POU 1" written in "STL" language, and Program C calls a function block "POU 1" written in "IL" language. The configuration defines two resources, Resource A of type FAST_CPU and Resource B of type SLOW_CPU connected by a communication network "Bus 1". The configuration allocates Task 1, which includes Program A, and Task 2, which includes Program B, to FAST_CPU, and Task 3 and Task 4, which respectively include Program A and Program C, to SLOW_CPU. Every task has an associated program. The configuration also defines three additional resources: "Resource C" of type "FPGA", "Resource D" of type "I/O Module", and "Resource E" of type "Switch". Notice that the interconnection between resources is also included in the configuration. For example, "Bus 3" interconnects "Resource C" and "Resource D", and "Bus 2" interconnects "Resource B" and "Resource E".

Every task includes a tuple that specifies the synchronous and priority configuration. For example, Task 1 executes periodically every 50 ms and has LOW priority, and Task 2 executes only when an interrupt triggered by I/O occurs and has HIGH priority. The synchronous and priority information is used by the run-time of the industrial controller to perform the scheduling and execution.

The most desirable solution for parallelizing IEC 61131-3 languages is the one that requires no user intervention or additional effort. Most IEC 61131-3 users are non-computer experts and therefore, these programming languages have been designed to satisfy the needs and increase the productivity of electrical, mechanical, and chemical engineers. Automatic parallelization of IEC 61131-3 languages is the most suitable approach for a transparent integration of multi-core technology into the industrial automation business.

SUMMARY

Exemplary embodiments of the invention as described herein generally include methods and systems for reducing the scan cycle time of control applications through multi-core execution and data dependency delays, which are cut points of the dataflow graph that partition the program into well balanced fragments that can be scheduled in multi-core processors. An autoparallelization technique for automation control languages according to an embodiment of the invention can partition a program into pipeline stages by inserting data dependency delays. By scheduling different pipeline stages to different cores, read operations can be executed more frequently and thus the scan cycle time can be reduced in favor of control accuracy. Pipelining a control application in multi-core processors enables a streaming industrial PLC controller architecture.

A method according to an embodiment of the invention can utilize current commodity multi-core processors to improve the scan cycle time of control applications, providing a less expensive solution than custom solutions which can run in virtually any modern platform that uses multi-core processors. A method according to an embodiment of the invention is implementation independent and language independent so that all control applications can benefit. A method according to an embodiment of the invention does not require manual and structural changes in the original program, and does not break data dependencies, but simply delays them.

According to an aspect of the invention, there is provided a method for pipeline parallelizing a control program for multi-core execution, including
using data dependency analysis on a control program to identify tasks that can be performed in parallel, identifying a largest task Tmax requiring the most execution time of the identified tasks, identifying cut-points in the largest task Tmax where data dependency delays decouple the task, inserting delayed data dependencies into cut-points of the largest task Tmax to create N pipeline sub-tasks, in which N is a number of cores available to a processor on which the control program will be executed, and scheduling the tasks and pipeline sub-tasks to the available processor cores.

According to a further aspect of the invention, the data dependency analysis is performed on a low-level intermediate representation of the control program.

According to a further aspect of the invention, the method includes identifying a read step, a process step, and a write step of the largest task Tmax, in which the cut-points are identified in the process step.

According to a further aspect of the invention, the pipeline sub-tasks are load-balanced.

According to a further aspect of the invention, the method includes scheduling each pipeline sub-task in its own processor core, in which output of a first pipeline sub-task is communicated to a processor core of a subsequent pipeline sub-task to be input to the subsequent pipeline sub-task, and in which the first pipeline sub-task can be executed in its core while the second pipeline sub-task is executing to generate an intermediate output that can be communicated to the core of the subsequent pipeline sub-task.

According to a further aspect of the invention, the method includes scheduling each pipeline sub-task to the same core, and scheduling intermediate executions of each pipeline subtask to different cores to generate an intermediate output for each pipeline sub-task simultaneous with a subsequent pipeline sub-task on its core.

According to a further aspect of the invention, the method includes using multiple cores of a multi-core processor to execute intermediate iterations of a first pipeline sub-task simultaneous with an iteration of a subsequent pipeline sub-task, privatizing memory locations of sensor data for every execution cycle of the pipeline sub-tasks to relax loop carried dependencies, committing a computation result of an intermediate iteration to one of the privatized memory locations, in which a most recent computation result is available to subsequent executions of the control program, and committing a computation result of the largest task to a main memory after each pipeline sub-task of the largest task has finished executing.

According to another aspect of the invention, there is provided a method for pipeline parallelizing a control program for execution on a multi-core processor, including translating source code of a control program into a lower-level intermediate representation, analyzing a workload of a process step of a largest task to identify one or more cut-points where the process step can be decoupled into stages, inserting a data dependency delay into each cut point to divide the largest task into pipelined stages, and scheduling the pipeline stages to the processor cores of the processor.

According to a further aspect of the invention, the scheduling is performed statically.

According to a further aspect of the invention, the scheduling is performed dynamically.

According to a further aspect of the invention, the method includes using data dependency analysis on the lower-level intermediate representation to identify tasks that can be performed in parallel, and identifying the largest task Tmax from the tasks that can be performed in parallel.

According to a further aspect of the invention, the method includes using multiple cores of a multi-core processor to execute intermediate iterations of a first pipeline stage simultaneous with an iteration of a subsequent pipeline stage, privatizing memory locations of sensor data for every execution cycle of the pipeline stages to relax loop carried dependencies, committing a computation result of an intermediate iteration to one of the privatized memory locations, in which a most recent computation result is available to subsequent executions of the control program, and committing a computation result of the process step of the largest task to a main memory after each pipeline stage of the process step has finished executing.

According to another aspect of the invention, there is provided a non-transitory program storage device readable by a computer, tangibly embodying a program of instructions executed by the computer to perform the method steps for pipeline parallelizing a control program for multi-core execution.

DETAILED DESCRIPTION OF EXEMPLARY EMBODIMENTS

Exemplary embodiments of the invention as described herein generally include systems and methods for reducing the scan cycle time of control applications through multi-core execution. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Embodiments of the invention provide methods to reduce the scan cycle time of control applications. Reducing the scan cycle time is one of the most important features in control systems. The ability of a control system to read and respond quickly to its environment is very important for applications such as motion control. Embodiments of the invention used delayed data dependencies that allow a program to be decoupled into stages that require less computational effort to execute. Thus, stages can be pipelined in a multi-processor environment to reduce the scan cycle time.

As a result, a scalable method that utilizes all the available resources in a multi-core processor is proposed. Unlike existing parallelization methods that attempt to reduce the execution time, methods according to embodiments of the invention target the reduction of scan cycle times by deliberately inserting additional communication into the execution time but can reduce the scan cycle time by overlapping the computation of contiguous cycles in different cores.

Figure 4:
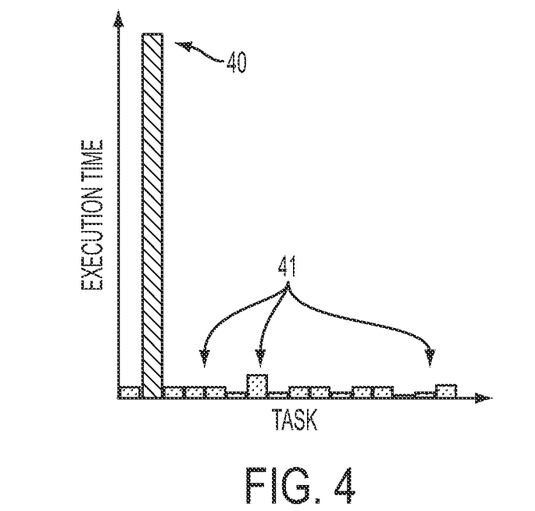
FIG. 4 illustrates the typical workload distribution of a control application, according to an embodiment of the invention.

Existing parallelization approaches for PLC applications rely on dataflow analysis to discover regions of statements that can be executed in parallel. The main issue with this approach is that the resulting parallel program is, most of the time, unbalanced in terms of workload. FIG. 4 shows a typical workload distribution in a PLC program after parallelization via data dependency analysis. Although several tasks are discovered, one single task 40 concentrates more than 90% of the total workload of the program, while the mother tasks 41 represent less than 10% of the total program workload. Parallelization methods cannot break the data dependencies within a single task without changing the semantics of the program. Therefore, the largest task cannot be partitioned and the performance gain when these programs are executed in multi-core processors is marginal, or worse than when executed in single-core.

Let a multi-core processor have an infinite number of processing units and instantaneous communication. Then, the maximum speedup of a parallel program is bounded by the critical path (longest task). Therefore, if a single task concentrates 90% of the total workload of the program, the maximum speedup, ignoring the cost of communication, is:

Max. Speedup=total workload/critical path=1/ 0.90=1.111.

Thus, to improve the performance of PLC applications, the largest task should be re-partitioned into smaller sub-tasks such that the critical path is reduced. Let the largest task of the previous example be re-partitioned into two sub-tasks that split the workload by half. The maximum speedup is:

Max. Speedup=1/0.50=2.00

However, the re-partition of the largest task cannot be accomplished by breaking the data dependencies because changing the semantics of the program may lead to incorrect results that are not acceptable in safety-critical control applications.

One way to achieve the re-partitioning of the largest task without incurring into data dependence violations is to re-write the PLC program to expose parallelism explicitly. The drawback of this approach is that a human expert must modify the PLC application in a time consuming and error prone activity.

A method according to an embodiment of the invention can partition a control program into stages by inserting data dependency delays rather than relying on partitioning algorithms dependent on the limited data parallelism typically available in control applications. An exemplary, non-limiting control program is an IEC 61131-3 program, however, those of ordinary skill in the art will recognize that techniques disclosed herein below are applicable to control programs in other languages. The program is partitioned in such a way that the read operations from the sensors are executed as fast and as early as possible so that data can be streamed to the computation stages of the program. By decoupling the program and delaying the data dependencies, a method according to an embodiment of the invention can use multiple cores to execute different parts of the program belonging to different cycles at the same time. Furthermore, by increasing the rate of sensor reads, a method according to an embodiment of the invention can reduce the sampling rate of the control application. Because the data dependencies are delayed instead of broken, the program is semantically identical to the original program. Although these data dependency delays introduce additional communication that may negatively affect the execution time of one program iteration, the advantage is that inputs can be read more frequently, which effectively reduces the scan cycle time of a single program iteration. In addition, because a method according to an embodiment of the invention is not dependent on data dependencies, it can be applied at compile-time or at run-time.

Figure 5:
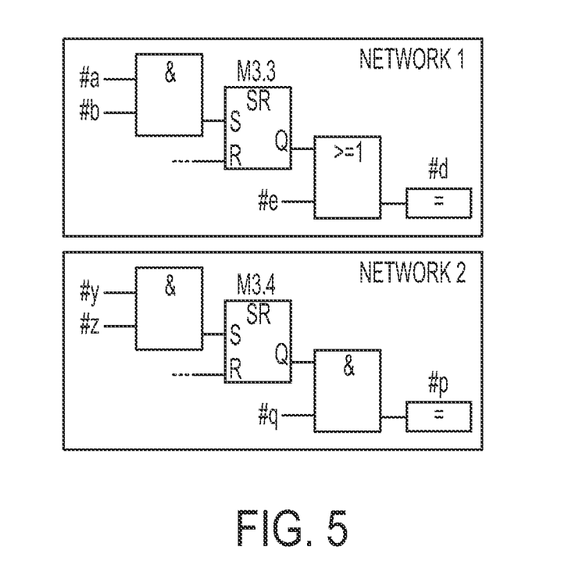
FIG. 5 illustrates two independent tasks identified from a control application, according to an embodiment of the invention.

First, the tasks must be identified. A task is a set of operations that are independent from other tasks but have dependencies within other operations in the task. For example, FIG. 5 shows a program composed of two "Networks". Network 1 performs a set of operations (&, SR, >=1) on operands #a, #b, and #e that are read from memory. The result is stored in operand #d. Here, the "SR" operation refers to a change of state of a flip-flop based on the values of inputs S and R. Similarly, Network 2 takes #y, #z, and #q as inputs, performs a set of operations (&, SR, &), and stores the result in operand #p. Notice that the operations in Network 1 are completely independent form the operands and intermediate results in Network 2. Therefore, Network 1 and Network 2 can be executed in parallel without producing any incorrect results. In this example, two tasks, one for each Network is created. Although in this example the two tasks are well balanced in terms of workload, by taking approximately the same time to execute, the reality in control applications is different and tasks are imbalanced and one single task frequently contains more than 90% of the program workload.

Figure 6:
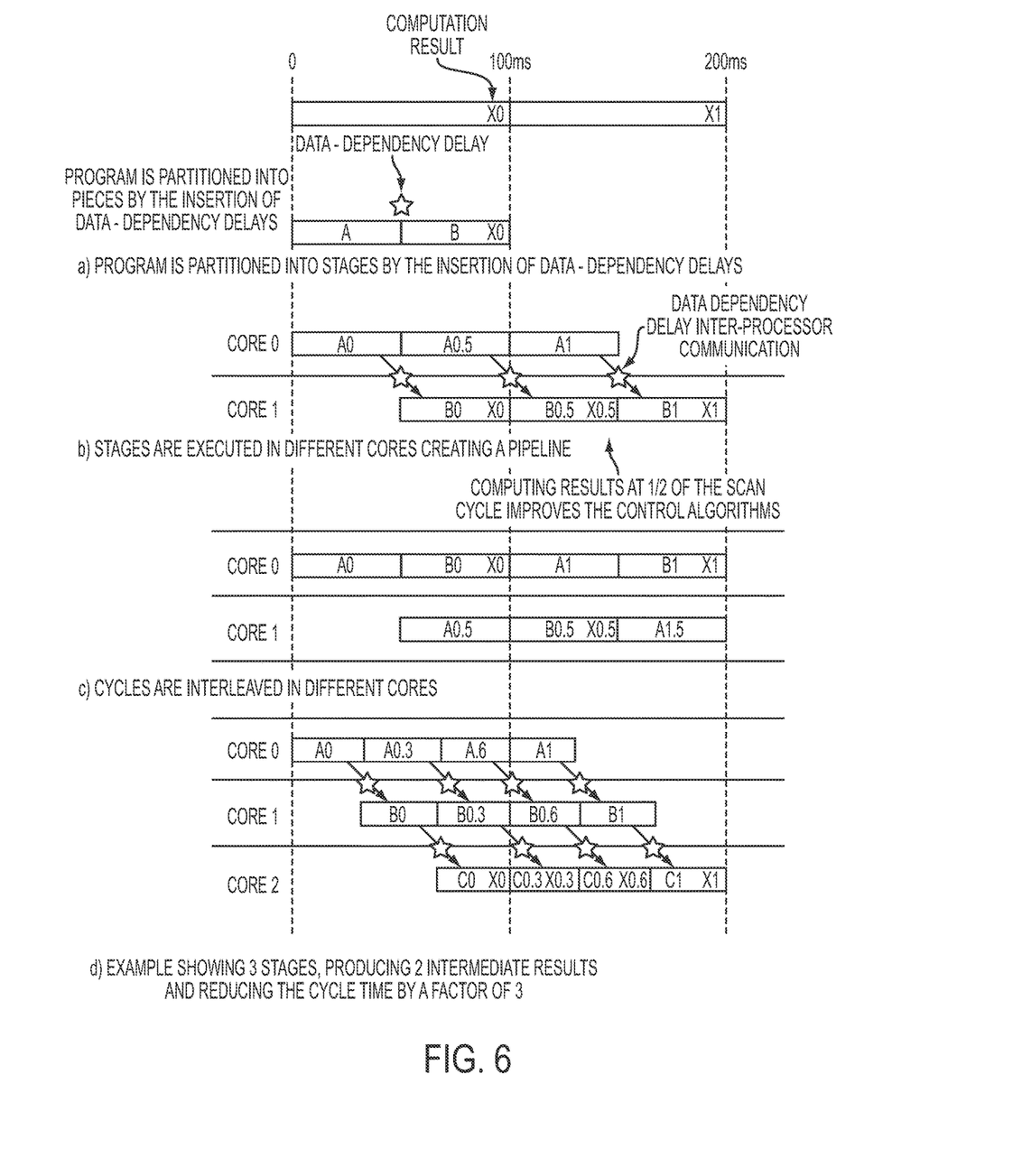
FIGS. 6(a)-(d) illustrate various methods for reducing cycle-time of control applications through execution in multi-core processors, according to an embodiment of the invention.

FIGS. 6(a)-(d) illustrate a method according to an embodiment of the invention. FIG. 6(a) illustrates how a program can be partitioned into stages by the insertion of data-dependency delays. As shown in the top left corner of FIG. 6(a), a method according to an embodiment of the invention partitions the largest task into sub-tasks of equal length so that the performance gains from parallel execution are maximized. The stars represent data dependency delays, or cut-points that partition the longest task into two stages: A and B. X0 represents an output vector. In this example, the user configured the program to be executed in cycles of 100 ms and therefore he/she receives the first output X0 after 100 ms, the second output X1 at 200 ms, and so on.

FIG. 6(b) shows that stages can be executed in different cores, creating a pipeline. As shown in FIG. 6(b), scheduling the two stages A and B to different cores, core 0 and core 1, requires the data dependency delays to be satisfied through inter-processor communication. Notice that the execution time of a cycle is:

$$TotalExecutionTime = \sum_{i=0}^{\#Stages} ExecutionTime(Stage_i) + CommunicationCost$$

For this example:

TotalExecutionTime=ExecutionTime($A$)+ExecutionTime($B$)+CommCost($A \rightarrow B$)

Although the data dependency delay introduces additional communication that may increase the execution time of a cycle, the advantage is that reading the inputs can be performed more frequently. In this example, when A0 in core 0 dispatches the computation to B0 in core 1, an additional read of the sensors A0.5 can begin in core 0 while B0 is being computed. With this scheme, the user experiences a scan cycle time that is 2× faster than the original program because intermediate results (X0.5, X1.5, X2.5, . . . ) are being produced.

A method according to an embodiment of the invention does not change the semantics of the program because at the scan cycle time boundaries (100 ms, 200 ms), the generated results (X0, X1) correspond to the same results obtained in the original program executed in a single processor (X0, X1). The difference is that a method according to an embodiment of the invention provides additional intermediate results (X0.5, X1.5) at half of the scan cycle time when two stages are created (150 ms, 250 ms,).

The main observation is that data dependency delays can decouple a program into stages that can be overlapped for parallel execution with other stages of contiguous cycles—e.g., stage A0.5 is executed at the same time as B0. By overlapping contiguous cycles a method according to an embodiment of the invention can achieve critical path compression. Reducing the scan cycle time of a control program improves the control algorithm because the logic can operate on more accurate and more recent sensor inputs and can generate results faster.

Current multi-core processors have communication mechanisms that are relatively expensive. An implementation of a method according to an embodiment of the invention should optimize the communication, but a method according to an embodiment of the invention should be flexible enough to accommodate different multi-core architectures.

FIG. 6(c) illustrates another embodiment for the program execution, in which cycle are interleaved in different cores. In this scheme, all the stages in the program (A and B) are executed in the same core (core 0) to avoid the additional communication cost. But the intermediate cycles (A0.5 and B0.5) are started in a different core (core 1) at 50 ms and 150 ms. Although the effect is the same, the communication cost between stages is eliminated because the data forwarding between stages A and B remains local to the core. The drawback is that intermediate stages must be accurately started exactly 50 ms after the cycle boundaries. Thus the issue of synchronization becomes explicit. The choice of scheduling schemes is architecture dependent.

FIG. 6(d) shows the same program partitioned into 3 sub-tasks of equal length A, B, and C, and scheduled into three cores, core 0, core 1, and core 2, reducing the scan cycle time by a factor of three. Here, two intermediate results are produced, X0.33 and X0.66, at 33.33 ms and 66.66 ms. The example shows that a method according to an embodiment of the invention is scalable with the number of available cores in the system. In this example a method according to an embodiment of the invention can effectively reduce the scan cycle time by a factor of 3. It is to be understood that the depiction of examples with 2 or 3 cores is exemplary and non-limiting, and that the parallelization techniques according to embodiments of the invention is not limited by the number of processor cores.

The inter-processor communication bandwidth is proportional to the number of stages in a program. Therefore, a scheduling algorithm should take into account these parameters:
  Workload distribution among the total number of tasks.
  Identification of the largest task, Tmax.

Identification of the minimal number of cut-points to insert the data dependency delays to reduce the overhead of inter-processor communication and to create an optimal workload balancing.

Assignment of tasks and stages of the largest task into different cores taking into consideration the communication cost.

Figure 7:
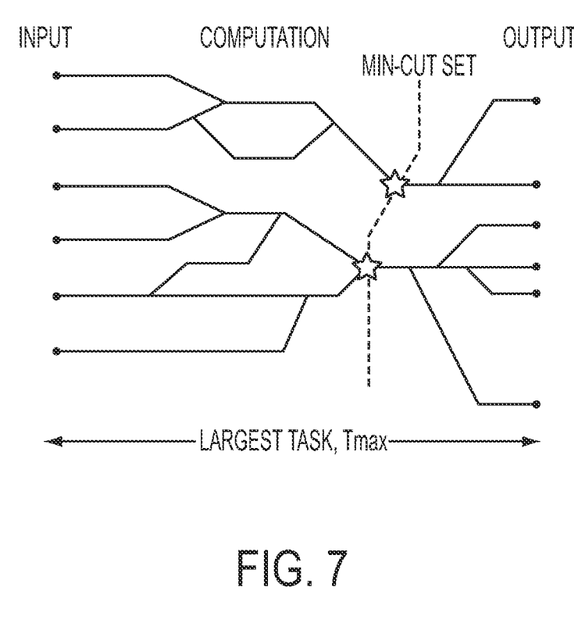
FIG. 7 illustrates a data flow graph and its min-cut, according to an embodiment of the invention.

FIG. 7 illustrates a process of finding a minimum set of cut-points of a largest task Tmax of a control application. From left to right, the inputs are read from the sensors, the control program performs some computation, and the outputs are written to actuators. Notice that the min-cut set does not necessarily partition the program in well-balanced fragments. Because delayed data dependency operators according to embodiments of the invention do not modify the semantics and behavior of the program, the scheduling algorithm can insert these operators anywhere in the program. However, while the primary goal is to find well balanced sub-tasks it is also important to maintain the insertion of delayed data dependencies to a minimum such that the communication cost and bandwidth is minimized.

A number of strategies can be used to identify the cut points, and different architectures may benefit from different strategies. For example, workload of the program can be analyzed to estimate how the workload can be balanced in equal parts. The program can then be optimized for memory bandwidth of the inter-processor communication, for a best CPU workload distribution in a heterogeneous multi-core environment, where not all CPUs have the same computation power, or for for network communication, where different resources are connected through different bus types with different performance properties. In addition, min-cut analysis can be used to find the smallest number of cut-points in the program dependence graph, and timing analysis can be used to insert data dependency delays so that the program is partitioned into identical time intervals. Combinations of some or all of these strategies can be used.

Figure 8:
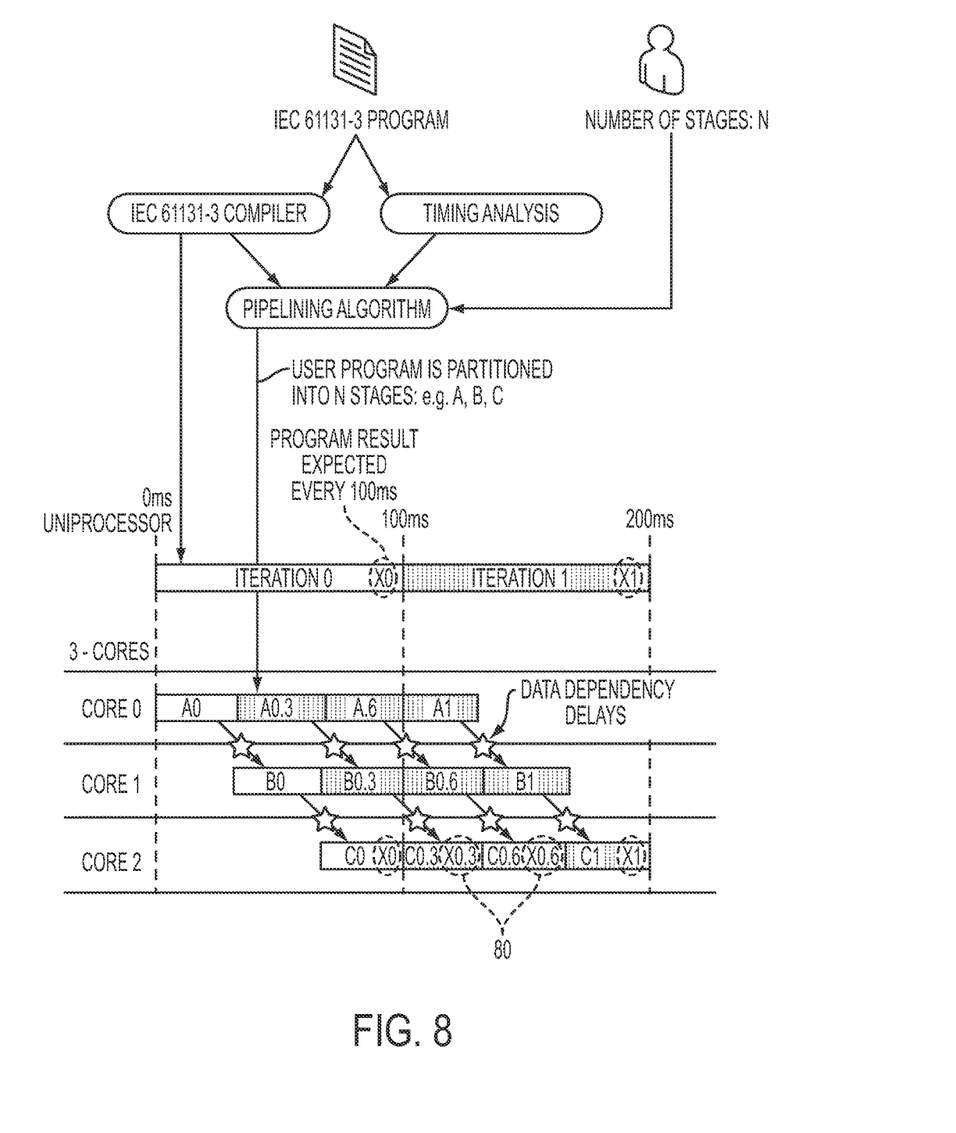
FIG. 8 illustrates the partitioning of a control program into N stages, according to an embodiment of the invention.

To further illustrate a method according to an embodiment of the invention, consider the exemplary, non-limiting IEC 61131-3 program shown in FIG. 8, whose uniprocessor scan cycle time is 100 ms. $X0$ represents the output vector of the first iteration and $X1$ the output of the second iteration. The implicit assumption made by the control engineers is that for every sample the system takes at most 100 ms.

Using a method according to an embodiment of the invention, the IEC 61131-3 compiler uses timing analysis to insert data dependency delays and partition the original program into N stages, where N is the number of processor cores. FIG. 8 depicts 3 cores, thus a user program being partitioned for a processor of FIG. 8 is partitioned into 3 stages: A, B, and C. However, one of skill in the art will understand that a partitioning method according to an embodiment of the invention can be applied to more or fewer cores. The stars in the figure represent the data dependency delays that are introduced to create pipeline stages. During execution, the PLC runtime system schedules the stages into different cores: A to core 0, B to core 1, and C to core 2. Notice that in the multi-core execution, $X0$ is output at 100 ms and $X1$ at 200 ms. These results correspond to those output in the uniprocessor version. However, notice that once the pipeline is filled after the 100 ms mark, intermediate results $X0.3$ and $X0.6$ are output at t=133.33 ms and t=166.66 ms, respectively. These intermediate iterations 80 improve the quality of the control algorithm because they provide a more recent snapshot of the physical system under control. This occurs because a pipelining approach according to an embodiment of the invention allows the sensors to be read again before the result of the current iteration is output, i.e. $A0.3$ and $A0.6$ are executed before $X0$ is output. In general, the performance improvement due to pipelining is proportional to the workload of the longest stage. If a program is partitioned into balanced stages, the scan cycle time improvement is proportional to the number of stages.

Figure 9:
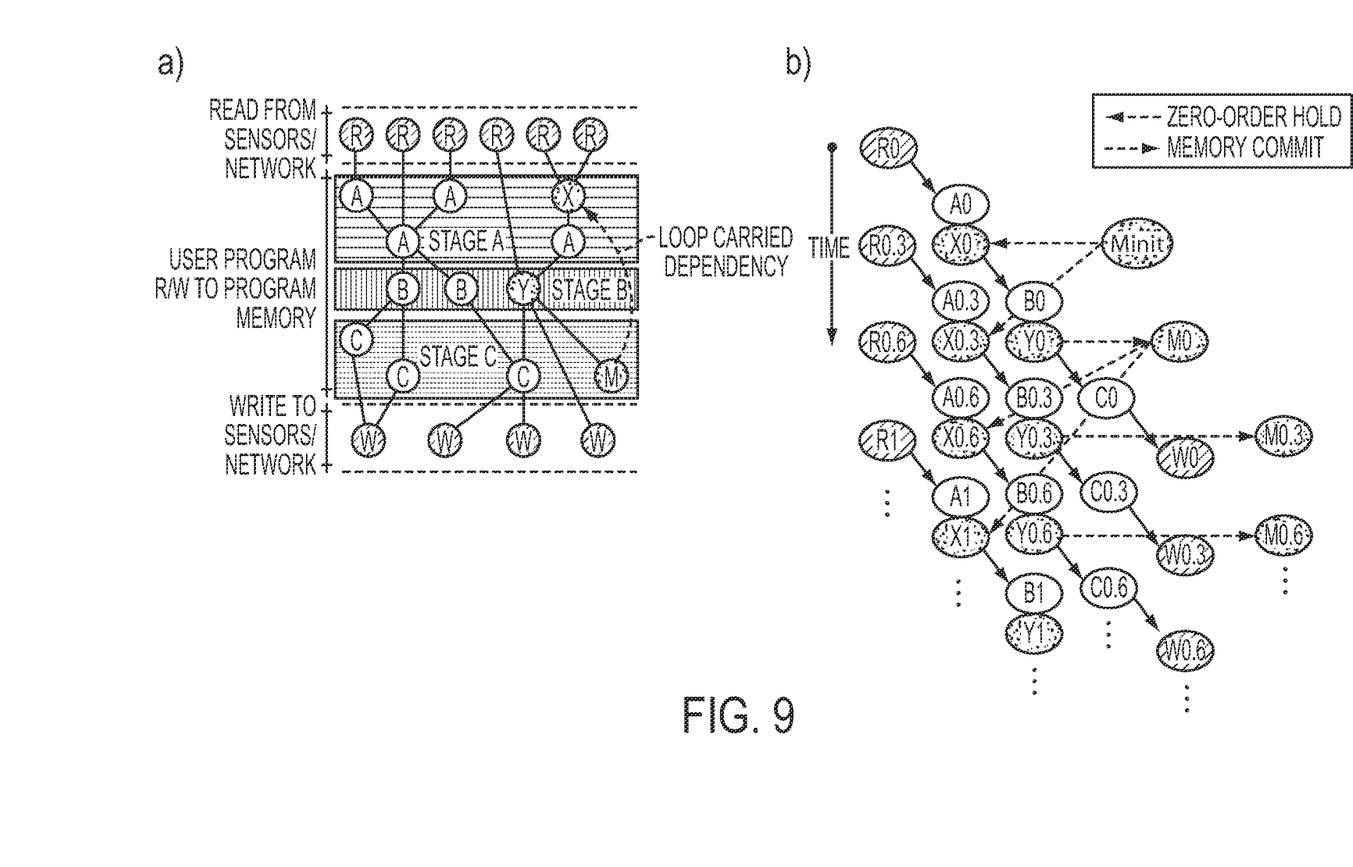
FIGS. 9(a)-(b) illustrate atomic steps of an industrial controller and how they can be streamed over multiple cores, according to an embodiment of the invention.

Creating equally balanced pipeline stages maximizes performance, and the IEC 61131-3 languages and runtime facilitate this process. All MC 61131-3 programs are logically divided into three sequential atomic steps as shown in FIG. 9(a): (1) Read from the sensors/network; (2) Process with the user program; and (3) Write to the sensors/network. Therefore, when the user program is executed, all reads from sensors and network have been performed, as represented by the "R" circles. Similarly, writes to sensors and network, represented by the "W" circles, are performed after all the operations from the user program, represented by circles in the process step, have completed.

Although this scheme already provides 3 atomic steps, Read, Process, and Write, the challenge is to partition the user program (Process) to create equally balanced pipeline stages: for example stages A, B, and C.

Handling loop carried dependencies within the memory space of the user program is critical because pipeline overlaps different iterations over time. In stream computing systems, this problem is solved by excluding the entire strongly connected component (SCC) (or feedback) formed by the loop carried dependency from the parallelization effort. This preserves the semantics of the program but it is ineffective for applications where most of the workload belongs to a single SCC.

A method according to an embodiment of the invention tackles this shared memory issue differently. Because memory locations (M) represent the state of sensors and actuators, these memory locations can be privatized for every cycle and the loop carried dependency is relaxed. Notice that this does not affect the correctness of the program because these memory locations represent sensor and actuator data that reflects the state of the physical system under control at any given point in time. FIG. 9(a) shows an SCC created by $X \rightarrow A \rightarrow Y \rightarrow M$, where X reads the memory location M at the beginning of the iteration, the computation executes A, and then Y executes and writes the result to the same memory location M that will be used by X in the next iteration. By privatizing M, each cycle has a unique and updated copy of the sensor and actuator data while allowing different cycles of the program to be overlapped in time to create a pipelined execution.

FIG. 9(b) illustrates an example of the privatized memory behavior in pipelining. Since the iterations overlap in time, $X0.3$ has a dependency on Minit instead of M0 because M0 is not available until Y0 completes. Minit would be initialized in the program itself. Since intermediate iterations, such as $X0.3$ and $X0.6$, are created to improve the sampling time of the controller to the environment and not to improve the execution time of a single iteration, the program memory behaves as a zero-order hold (ZOH) in which memory writes (commits) are performed after an iteration completes and memory reads are always available but provide the latest committed value. This mechanism maintains consistent memory values for the intermediate iterations that are aligned to the original scan cycle time boundaries (e.g. $X0$, $X1$, $X2$, . . . ). Similarly, writes from intermediate iterations, such as $Y0.3$ and $Y0.6$, are not stored to the main memory but into privatized copies of the program memory space. IEC 61131-3 implementations limit the size of the memory space for a user program to a few kilobytes. Therefore, it is feasible to maintain multiple copies, one per iteration at any given point in time, of the entire user memory space.

When analyzing the software, the data dependency analysis will identify loop carried dependencies that cannot be broken. However, by privatizing the memory and making it behave as a zero-order hold, the loop carried dependency is not broken but is "relaxed" as what is stored and read from the memory area is the state of the sensors and actuators, or the state of the physical system under control. This observation makes the insertion of data dependency delays completely arbitrary as it does not affect the correctness of the program.

Algorithm 1 shows a pipelining algorithm for industrial PLC controllers, according to an embodiment of the invention. An IEC 61131-3 compiler first translates the high-level user program into its internal intermediate representation. A low-level intermediate representation provides a more accurate estimation of the workload as instructions are closer to the actual target architecture and all data dependencies are exposed. Parallel tasks in the program are identified using data dependency analysis, and the task using the most time and resources is identified. This task is separated logically into Read, Process, and Write steps and the actual user program (Process) is analyzed to identify cut-points and is partitioned into N stages with the insertion of data dependency delays at the cut-points that replace definition-use chains with pipeline stage communication primitives. A flowchart of Algorithm 1 appears in FIG. 11. It is to be understood that, for simplicity of explanation, although the methods steps of Algorithm 1 are described in terms of an IEC 61131-3 program and compiler, one of ordinary skill in the art can easily apply these techniques to control programs written in other computer languages.

Figure 11:
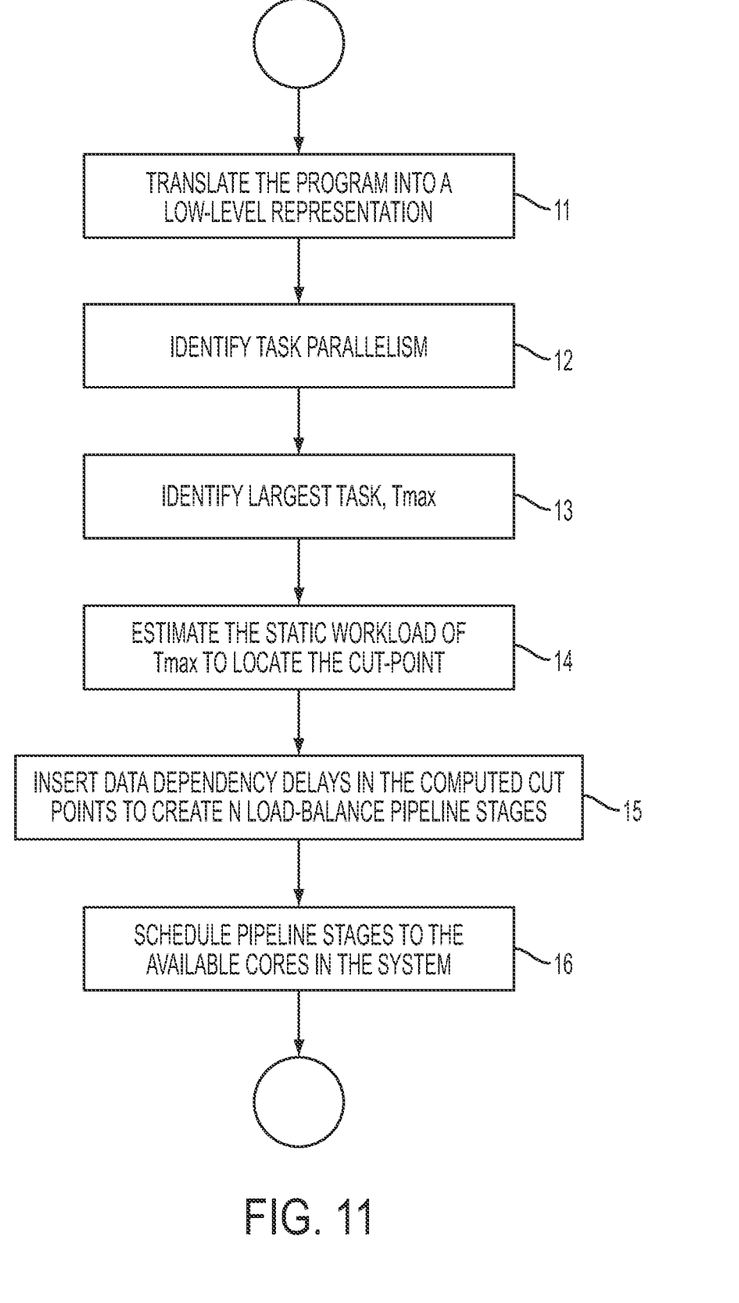
FIG. 11 is a flowchart of a pipelining algorithm for industrial PLC controllers, according to an embodiment of the invention.

ALGORITHM 1: Pipelining an IEC 61131-3 Program
Input: An IEC 61131-3 Program and the desired number of stages N
Output: A pipelined program for execution in a multi-core PLC.
1. Translate the program into a low-level representation. (Step 11)
2. Identify task parallelism using data dependency analysis. (Step 12)
3. Identify largest task, Tmax. (Step 13)
4. Estimate the static workload of the Process step of Tmax through timing analysis to locate the cut-points where data dependency delays decouple Tmax into N stages. (Step 14)
   /* Loop carried dependencies are relaxed because of ZOH and memory privatization, which permits better load balancing. */
5. Insert data dependency delays in the computed cut points to create N additional load-balanced pipeline stages. (Step 15)
   /* Replace def-use chains with pipeline communication primitives. */
6. Statically or dynamically schedule pipeline stages to the available cores in the system. (Step 16)

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 10:
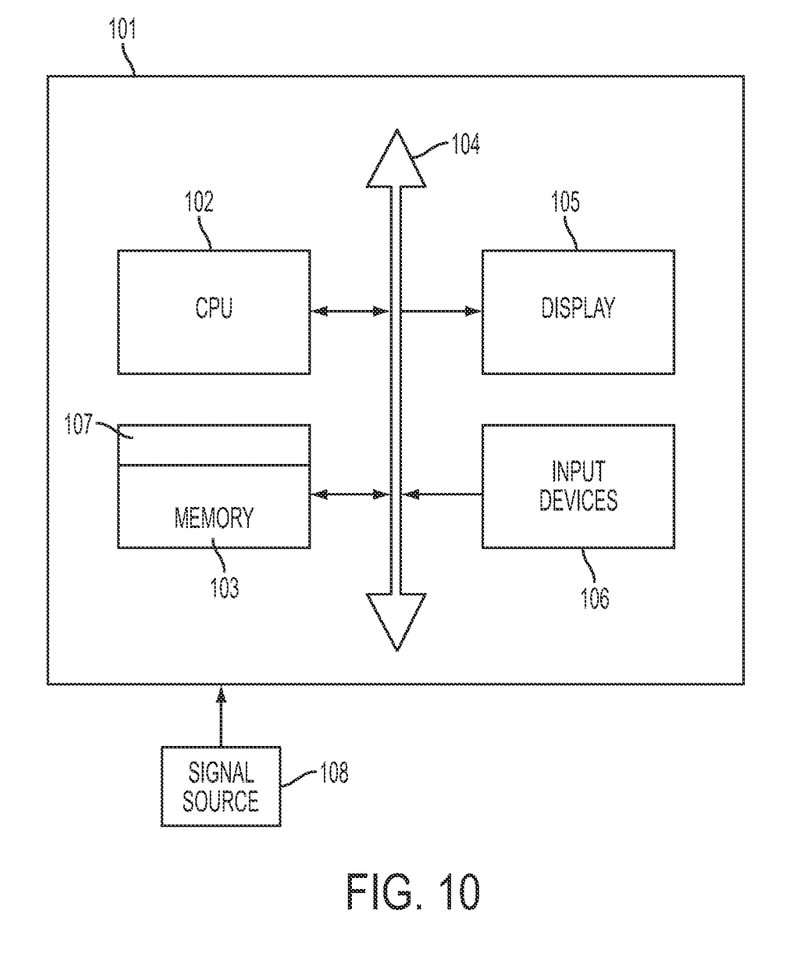
FIG. 10 is a block diagram of an exemplary computer system for implementing a method for reducing the scan cycle time of control applications through multi-core execution, according to an embodiment of the invention.

FIG. 10 is a block diagram of an exemplary computer system for implementing a method for reducing the scan cycle time of control applications through multi-core execution, according to an embodiment of the invention. Referring now to FIG. 10, a computer system 101 for implementing the present invention can comprise, inter alia, a multi-core central processing unit (CPU) 102, a memory 103 and an input/output (I/O) interface 104. The computer system 101 is generally coupled through the I/O interface 104 to a display 105 and various input devices 106 such as a mouse and a keyboard. The support circuits can include circuits such as cache, power supplies, clock circuits, and a communication bus. The memory 103 can include random access memory (RAM), read only memory (ROM), disk drive, tape drive, etc., or a combinations thereof. The present invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention.

The computer system 101 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method for pipeline parallelizing a control program for multi-core execution, comprising:
   performing a data dependency analysis on the control program to identify a plurality of tasks, each task comprising a set of operations executable over a plurality of scan cycles independent from the other tasks;
   identifying the largest task requiring the most execution time of the identified tasks;
   identifying cut-points in the largest task where data dependency delays decouple the largest task;
   inserting delayed data dependencies into the cut-points of the largest task to create N pipeline sub-tasks, wherein N is a number of cores available to a processor on which the control program will be executed; and
   scheduling the pipeline sub-tasks to the available processor cores in a manner that enables multiple scan cycles of the largest task to be executed in parallel,
   wherein each pipeline sub-task is scheduled to a first core for a first scan cycle, and a parallel execution of each pipeline sub-task is scheduled to one or more second cores for a second scan cycle which is interleaved with the first scan cycle to generate an intermediate output for each pipeline sub-task on the one or more second cores simultaneous with a subsequent pipeline sub-task on the first core.

2. The method of claim 1, wherein the data dependency analysis is performed on a low-level intermediate representation of the control program.

3. The method of claim 1, further comprising identifying a read step, a process step, and a write step of the largest task wherein the cut-points are identified in the process step.

4. The method of claim 1, wherein the pipeline sub-tasks are load-balanced.

5. The method of claim 1, further comprising scheduling each pipeline sub-task in its own processor core, wherein output of a first pipeline sub-task is communicated to a processor core of a subsequent pipeline sub-task to be input to the subsequent pipeline sub-task, and wherein the first pipeline sub-task can be executed in its core while a second pipeline sub-task is executing to generate an intermediate output that can be communicated to the core of the subsequent pipeline sub-task.

6. The method of claim 1, further comprising:
using multiple cores of a multi-core processor to execute intermediate iterations of a first pipeline sub-task simultaneous with an iteration of a subsequent pipeline sub-task;
privatizing memory locations of sensor data for every execution cycle of the pipeline sub-tasks to relax loop carried dependencies;
committing a first computation result of an intermediate iteration to one of said privatized memory locations, wherein a most recent computation result is available to subsequent executions of the control program; and
committing a second computation result of the largest task to a main memory after each pipeline sub-task of said largest task has finished executing.

7. A method for pipeline parallelizing a control program for execution on a multi-core processor comprising:
translating source code of the control program into a lower-level intermediate representation;
analyzing a workload of a process step of a largest task to identify one or more cut-points where the process step can be decoupled into stages;
inserting a data dependency delay into each cut point to divide the largest task into pipelined stages; and
scheduling the pipeline stages to the processor cores of the processor in a manner that enables multiple scan cycles of the largest task to be executed in parallel,
wherein each pipelined stage is scheduled to a first core for a first scan cycle, and a parallel execution of each pipelined stage is scheduled to one or more second cores for a second scan cycle which is interleaved with the first scan cycle to generate an intermediate output for each pipelined stage on the one or more second cores simultaneous with a subsequent pipelined stage on the first core.

8. The method of claim 7, wherein the scheduling is performed statically.

9. The method of claim 7, wherein the scheduling is performed dynamically.

10. The method of claim 7, further comprising:
using data dependency analysis on the lower-level intermediate representation to identify tasks that can be performed in parallel; and
identifying the largest task from the tasks that can be performed in parallel.

11. The method of claim 7, further comprising:
using multiple cores of a multi-core processor to execute intermediate iterations of a first pipeline stage simultaneous with an iteration of a subsequent pipeline stage;
privatizing memory locations of sensor data for every execution cycle of the pipeline stages to relax loop carried dependencies;
committing a first computation result of an intermediate iteration to one of said privatized memory locations, wherein a most recent computation result is available to subsequent executions of the control program; and
committing a second computation result of the process step of the largest task to a main memory after each pipeline stage of said process step has finished executing.

12. A non-transitory program storage device readable by a computer, tangibly embodying a program of instructions executed by the computer to perform a method for pipeline parallelizing a control program for multi-core execution, the method comprising:
performing a data dependency analysis on the control program to identify a plurality of tasks, each task comprising a set of operations executable over a plurality of scan cycles independent from the other tasks;
identifying the largest task requiring the most execution time of the identified tasks;
identifying cut-points in the largest task where data dependency delays decouple the largest task;
inserting delayed data dependencies into the cut-points of the largest task to create N pipeline sub-tasks, wherein N is a number of cores available to a processor on which the control program will be executed; and
scheduling the tasks and pipeline sub-tasks to the available processor cores in a manner that enables multiple scan cycles of the largest task to be executed in parallel,
wherein each pipeline sub-task is scheduled to a first core for a first scan cycle, and a parallel execution of each pipeline sub-task is scheduled to one or more second cores for a second scan cycle which is interleaved with the first scan cycle to generate an intermediate output for each pipeline sub-task on the one or more second cores simultaneous with a subsequent pipeline sub-task on the first core.

13. The non-transitory program storage device of claim 12, wherein the data dependency analysis is performed on a low-level intermediate representation of the control program.

14. The non-transitory program storage device of claim 12, the method further comprising identifying a read step, a process step, and a write step of the largest task wherein the cut-points are identified in the process step.

15. The non-transitory program storage device of claim 12, wherein the pipeline sub-tasks are load-balanced.

16. The non-transitory program storage device of claim 12, the method further comprising scheduling each pipeline sub-task in its own processor core, wherein output of a first pipeline sub-task is communicated to a processor core of a subsequent pipeline sub-task to be input to the subsequent pipeline sub-task, and wherein the first pipeline sub-task can be executed in its core while a second pipeline sub-task is executing to generate an intermediate output that can be communicated to the core of the subsequent pipeline sub-task.

17. The non-transitory program storage device of claim 12, the method further comprising:
  using multiple cores of a multi-core processor to execute intermediate iterations of a first pipeline sub-task simultaneous with an iteration of a subsequent pipeline sub-task;
  privatizing memory locations of sensor data for every execution cycle of the pipeline sub-tasks to relax loop carried dependencies;
  committing a first computation result of an intermediate iteration to one of said privatized memory locations, wherein a most recent computation result is available to subsequent executions of the control program; and
  committing a second computation result of the largest task to a main memory after each pipeline sub-task of said largest task has finished executing.

* * * * *